(12) United States Patent
Soubjaki

(10) Patent No.: US 6,782,912 B2
(45) Date of Patent: Aug. 31, 2004

(54) THROTTLE ASSEMBLY FOR A FLOWING MEDIUM

(75) Inventor: Sam Soubjaki, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 10/143,091

(22) Filed: May 13, 2002

(65) Prior Publication Data
US 2003/0019521 A1 Jan. 30, 2003

(30) Foreign Application Priority Data
May 11, 2001 (DE) .......................................... 101 23 033

(51) Int. Cl.$^7$ ................................................. F16K 1/12
(52) U.S. Cl. ............. 137/219; 123/339.14; 137/625.31; 251/163
(58) Field of Search ..................... 123/339.14; 137/219, 137/625.31; 251/163, 208

(56) References Cited

U.S. PATENT DOCUMENTS 4,979,484 A * 12/1990 Sailer .......................... 123/585

* cited by examiner

Primary Examiner—Gerald A. Michalsky
(74) Attorney, Agent, or Firm—Ronald E. Greigg

(57) ABSTRACT

In a throttle assembly for a flowing medium having an inlet and outlet and having two throttle devices disposed between them coaxially to one another, which each have at least one flow window for the passage of a flow of the medium flowing from the inlet to the outlet and are rotatable relative to one another for controlling the flow of the medium, in order to avoid friction and wear between the throttle devices and to assure a closing position without leakage flows, the throttle devices are embodied as hollow cones, with a cone jacket including at least one flow window, and the cones are disposed concentrically to one another in such a way that in the closing region of the throttle assembly, they are displaced axially toward one another by displacement means.

21 Claims, 4 Drawing Sheets

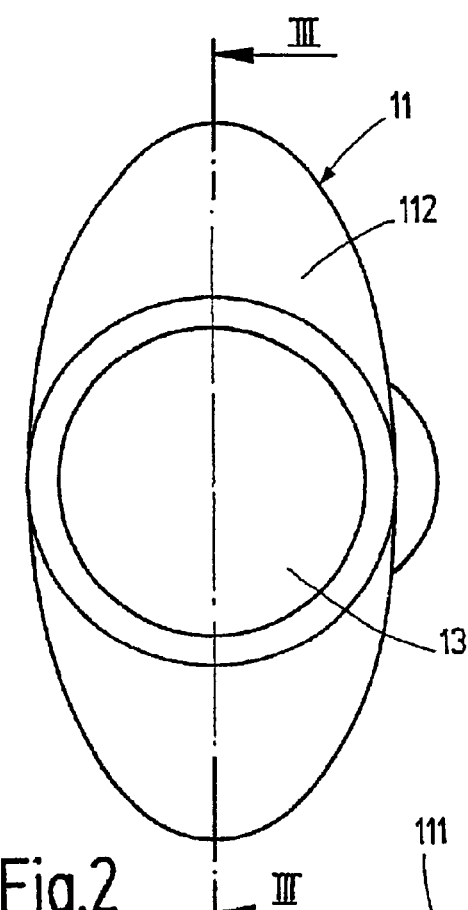
Fig.2
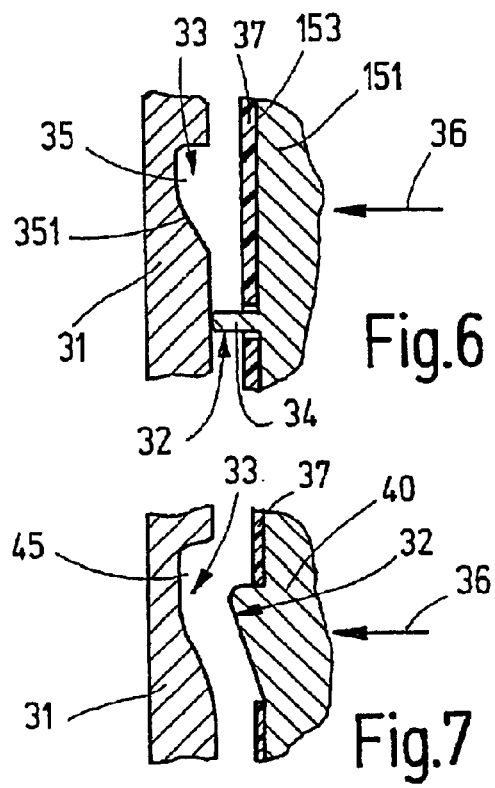
Fig.6
Fig.7
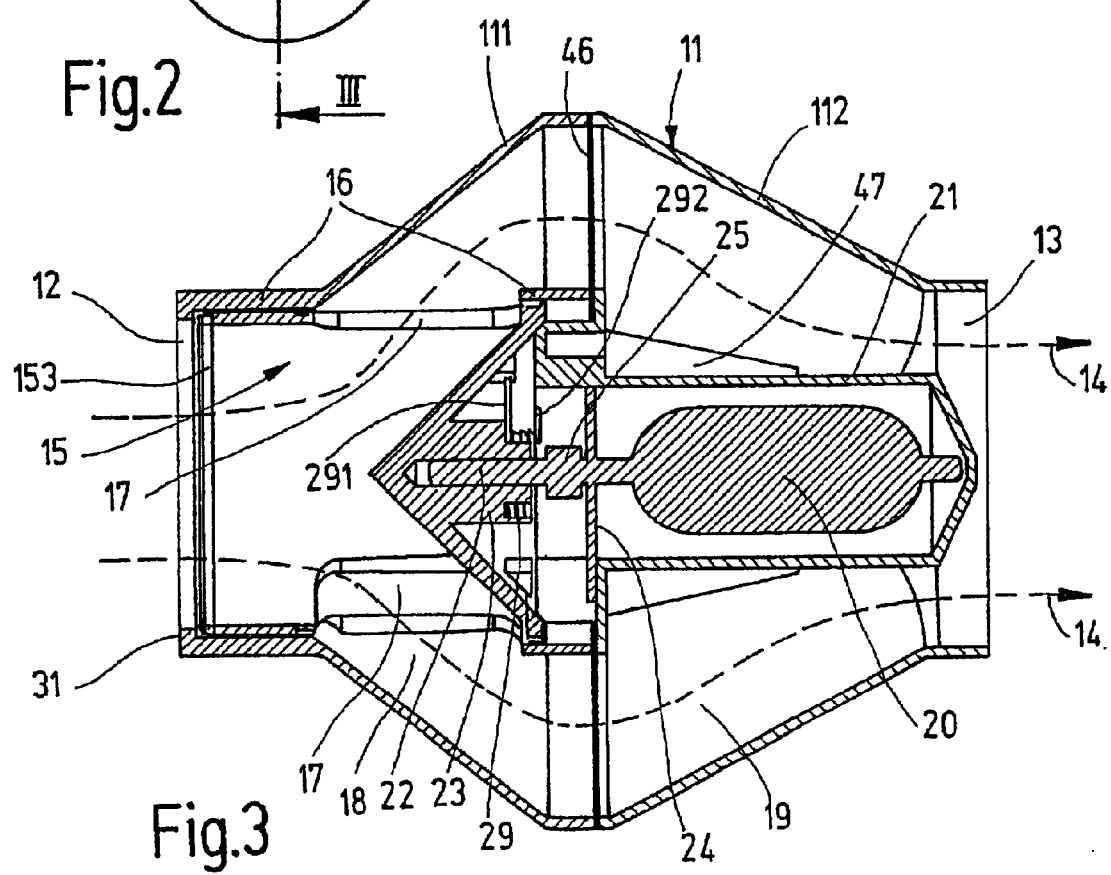
Fig.3

THROTTLE ASSEMBLY FOR A FLOWING MEDIUM

BACKGROUND OF THE INVENTION

1. Field of the Invention

The invention is based on a throttle assembly for a flowing medium such as an air flow in an internal combustion engine.

2. Description of the Prior Art

In one known throttle assembly for controlling the idling air quantity for an internal combustion engine (German Patent Disclosure DE 38 01 084 A1), the outer of the coaxially disposed throttle devices is embodied as a housing pot, which protrudes into a bypass line and has flow windows, disposed diametrically in the cup jacket, that are congruent with the inside cross section of the bypass line. The inner throttle device is embodied in the form of a tubular segment with one flow window in the tube segment, and with its circumference it protrudes quite close to the inner wall of the cup jacket. The inner throttle device is rotated by a control motor, and its flow window is made to overlap more or less with one of the flow windows in the cup jacket, thereby uncovering the flow window in the cup jacket to a greater or lesser extent. The rotation of the inner throttle device is effected counter to the force of a restoring spring, embodied for instance as a spiral spring, which when the control motor is not activated presses the inner throttle device against a stop.

OBJECT AND SUMMARY OF THE INVENTION

The throttle assembly of the invention has the advantage that because of the conical embodiment of the two concentrically disposed throttle devices and because of the axial relative displaceability of the two throttle devices in the closing region, it closes completely tightly on the one hand without even the least leakage flows, and on the other, over the entire adjusting range, it runs smoothly because the friction between the throttle devices is minimized and thus requires only slight adjusting forces, which has an advantageous effect on the power and size of an electric control motor for the one throttle device. Because of the reduced friction between the throttle devices, the wear of the throttle devices drops as well, thus lengthening the service life of the throttle assembly.

The size of the flow windows in the throttle devices can be selected arbitrarily, so that by replacing one of the two throttle devices by another with a different window size, the control characteristic curve of the throttle assembly can be adapted very easily to a given application.

Because of the conicity and displaceability of the throttle devices, self-cleaning of the throttle assembly can be achieved in a simple way; in a separate cleaning phase in the closing position of the throttle assembly, one of the cones is set into an oscillating pivoting motion with a small pivoting range. As a result, particles of dust, soot or dirt deposited between the throttle devices are removed.

All the components of the throttle assembly can be made from plastic, making the throttle assembly lightweight and economical to produce. Major production variations that occur in plastic injection molding do not cause leakage of the throttle assembly in the closing direction, making post-machining of the plastic parts unnecessary.

The throttle assembly of the invention can be used to control the air and combustion mixture or for recirculating exhaust gas in internal combustion engines. The throttle assembly can be inserted directly into the air intake tube, for instance, or into the inlet manifold of the engine.

In a preferred embodiment of the invention, the displacement means have a stop and a counterpart stop cooperating with it, each of which is disposed on one of the cones, and a spring element that presses the stop and counterpart stop against one another in the axial direction of the cones. Between the stop and the counterpart stop, at least one axially protruding plunger member and at least one axially set-back receiving member corresponding with it are provided, of which one is disposed on the stop and one on the counterpart stop in such a way that in the closing region of the throttle assembly, the plunger member plunges into the receiving member. As a result of this structural design, a displacement means for the cones in the closing region of the throttle assembly is created in a simple way, and at the same time the friction between the cones outside the closing region is kept slight; this is because in the rest of the adjusting region, the plunger members, limited in number for instance to three, offset by 120° circumferentially from one another, rest on the stop or the counterpart stop. By rounding off the face ends of the plunger members, the friction still existing between the cones is limited to the bearing points of the plunger members; the frictional force is brought to bear by the spring element of a compression spring. In this adjustment range, there is a gap spacing between the jacket faces of the two cones, so that no friction is generated there.

To achieve a replicable control characteristic curve of the throttle assembly over the adjusting path of the throttle devices, at least one cone, in an advantageous embodiment of the invention, has a sealing ring, surrounding the flow window, on its jacket face oriented toward the other cone. By means of this sealing ring, which rests on the jacket face, oriented toward it, of the other cone without significant friction, it is possible, when the flow windows of the cones have been made to overlap partially, to prevent the flow of secondary air flows through the gap between jacket faces, which would cause an uncontrollable imprecision of the control characteristic curve.

In advantageous embodiment of the invention, a ring seal is disposed on one of the ends of the two cones, between the faces of the cones oriented toward one another, and is secured to one of the cone jackets. By means of this ring seal, when the throttle assembly is disposed in the fuel preparation system of an internal combustion engine, damage to the throttle assembly from backfiring is averted.

In an advantageous embodiment of the invention, an electric control motor with a power take-off shaft is disposed in the housing; the power take-off shaft is coupled to the rotatable, axially displaceable inner cone via an intermediate gear. Because the control motor is disposed in the housing itself, it is bathed by flowing medium, as a result of which good heat dissipation of the heat losses produced in the control motor is achieved. The heat dissipation can be improved still further if in a further embodiment of the invention, fins or other axial protrusions are provided on the motor housing received in the housing 11 and can be used simultaneously for laminarizing the flow of the medium.

In an advantageous embodiment of the invention, the housing is embodied in two parts and has two flow windows that can be put together in a plane oriented transversely to the housing axis. One housing part contains one of the housing openings forming the inlet and the outlet and also contains the motor housing, while the other housing part has the other housing opening and the outer cone of the two cones. This structural design makes it substantially easier to insert the cones, electric control motor and gear into the housing. The two housing parts are joined together by a simple joining process, by means of snap fastener elements or ultrasonic welding or other connecting means or processes. Furthermore, the possibility is created of placing an air filter or an element for laminarizing the flowing medium, such as a slotted disk, in the connecting plane of the two housing parts.

In an advantageous embodiment of the invention, the cone communicating with the housing opening forming the inlet is embodied as a lattice structure comprising two axially spaced-apart rings and ribs joining the rings together; and the fields in the cone jacket that are enclosed by the rings and ribs, with the exception of at least one field forming the flow window, are closed by a flexible layer of a sealing material. Because of the vacuum created in the closing region of the throttle assembly in the cone that communicates with the inlet, the flexible layer bulges and increases its spacing from the jacket face of the other cone, thus further reducing the friction between the cones. With this structural design, the flexible layers of sealing material form a seal between the jacket faces of the two cones over the entire adjusting range, so that an encompassing seal around the flow windows of the cones can be dispensed with.

BRIEF DESCRIPTION OF THE DRAWINGS

The invention will be better understood and further objects and advantages thereof will become more apparent from the ensuing detailed description of preferred embodiments taken in conjunction with the drawings, in which:

FIG. 2 is an elevation view of the throttle assembly in the direction of the arrow II in FIG. 1;

FIG. 3 is a section taken along the line III—III in FIG. 2;

FIG. 6 is a fragmentary section of a developed view of the ends, facing one another, of the throttle devices of the throttle assembly in FIGS. 1–3;

FIG. 7 is an identical view to FIG. 6 for a modified embodiment of the throttle device ends.

DESCRIPTION OF THE PREFERRED EMBODIMENTS

Figure 1:
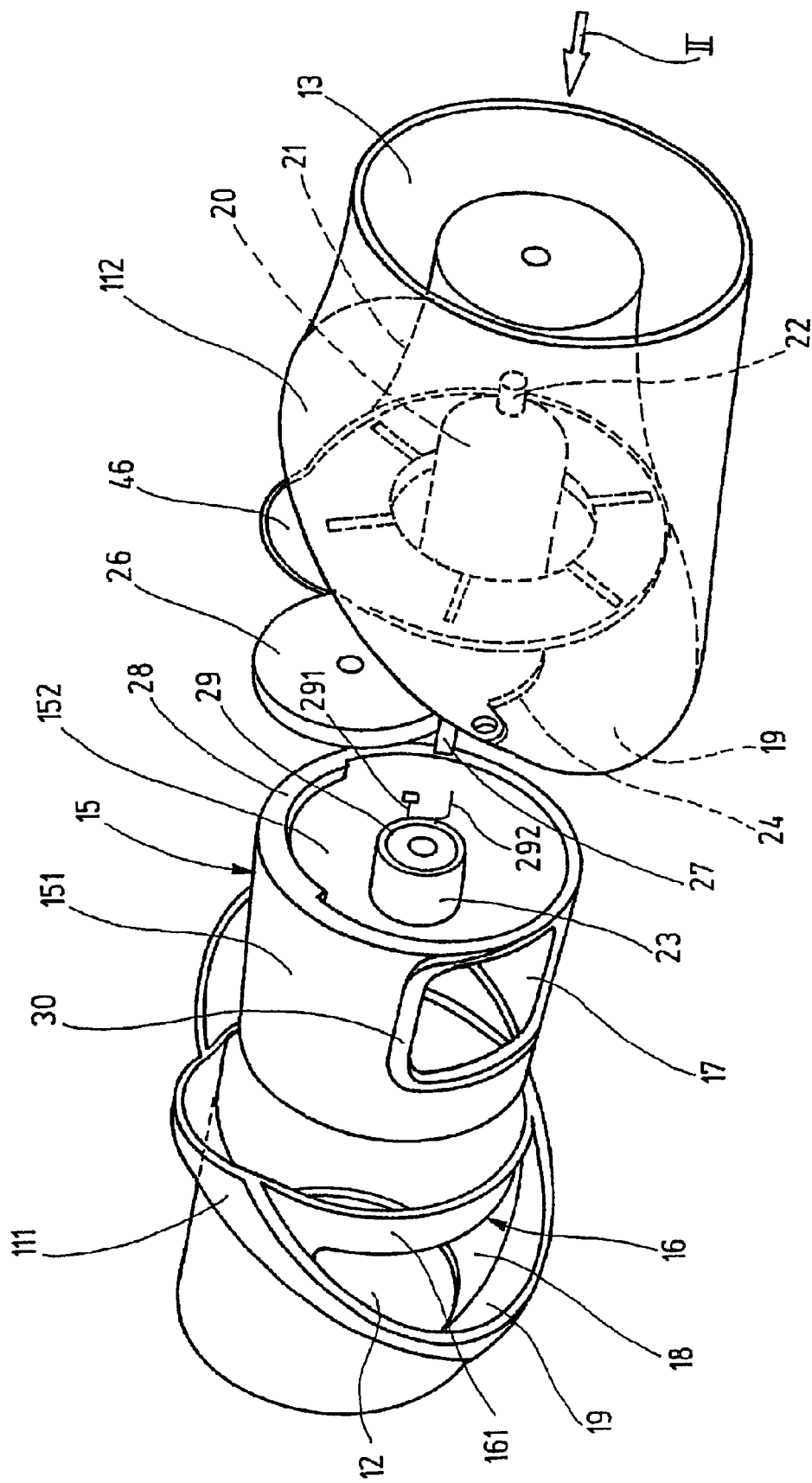
FIG. 1 is an exploded perspective view of a throttle assembly for a flowing medium.

The throttle assembly, shown in several exemplary embodiments in the drawings, for a flowing medium is used for instance for installation in the fuel preparation system of an internal combustion engine, especially in the air intake stub. However, like the known throttle assembly described at the outset, it can also be used in a bypass line for regulating the idling rpm of an internal combustion engine.

As the exploded view in FIG. 1 and the sectional view in FIG. 3 show, the throttle assembly has a housing 11 with two housing openings 12, 13, which can be used selectively as an inlet or outlet for the flowing medium. In the exemplary embodiment of the throttle assembly in FIGS. 1–3, as indicated by the flow direction of the medium represented by the arrows 14 in FIG. 3, the housing opening 12 is used as an inlet and the housing opening 13 is used as an outlet. The housing 11 is put together from two housing parts 111 and 112; the two housing parts 111 and 112 abut one another, are locked together and optionally welded ultrasonically in a plane extending transversely to the housing axis. It is understood that the two housing parts 111 and 112 can also be joined together to make the complete housing 11 by other connecting means or methods in such a way that they are either separable or inseparable. The two housing parts 111 and 112 are made of plastic.

The throttle assembly has two throttle devices, placed between the housing openings 12, 13 in the housing 11 and disposed coaxially to one another of a flow of the medium, flowing through the housing 11 between the housing openings 12, 13; the flow of the medium can be controlled between a maximum and zero by relative rotation of the two throttle devices to one another. Each throttle device is embodied as a hollow cone 15 and 16, respectively; the cones 15, 16 are disposed concentrically to one another in such a way that an annular gap remains between their jacket faces 151 and 161. The jacket faces 151 and 161 each have two diametrically opposed flow windows 17 and 18, respectively. In the exemplary embodiment of FIGS. 1–3, the outer cone 16 is embodied integrally with the housing part 111 of the housing 11, while in the exemplary embodiment of FIG. 8 it is embodied as an independent component inserted into the housing part 111 and secured suitably therein. The inner cone 15 is embodied as rotatable relative to the outer cone 16 and is furthermore displaced axially in the closing region of the throttle assembly; the axial displacement is derived from the rotary motion of the inner cone 15. The closing region of the throttle assembly is the region of rotation of the inner cone 15 within which the flow windows 17, 18 in the cones 15, 16 do not overlap. The two cones 15, 16 are disposed in the housing 11 in such a way that the outer cone 16 is surrounded by a housing chamber 19 that communicates with the housing opening 13, while the inner cone 15 communicates with the housing opening 12; in the exemplary embodiment of FIGS. 1–3, one open face end of the inner cone 15 is congruent with the housing opening 12. On the end remote from this face end, the inner cone 15 is closed off by a conical cone base 152. The common axis of the cones 15, 16 is aligned with the two axes of the housing openings 12, 13.

Figure 8:
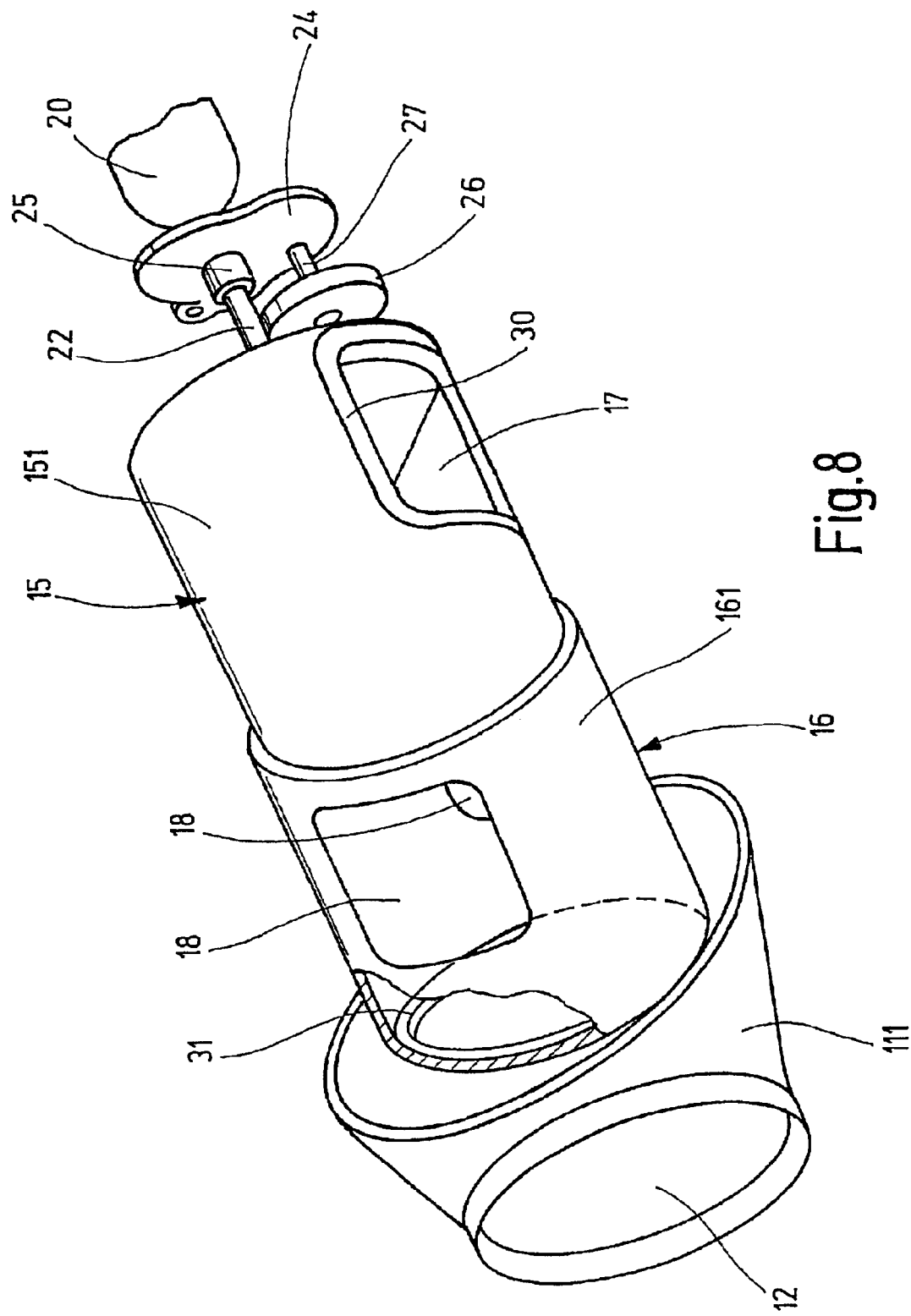
FIG. 8 is a fragmentary, exploded perspective view of the throttle assembly in a further exemplary embodiment.

For rotating the inner cone 15 relative to the fixed outer cone 16, an electric control motor 20 is disposed in the housing 11. The control motor 20 is integrated with a motor housing 21, which in turn is secured in the housing part 112 of the housing 11 in such a way that once the two housing parts 111, 112 have been put together, the power take-off shaft 22 of the control motor 20 protrudes into the housing part 111. The cone base 152, which protrudes with its cone into the interior of the inner cone 15 has a peg 23 on the outside; this peg, which is coaxial and integral with the cone base 152, is slipped loosely onto the end of the power take-off shaft 22 protruding into the housing part 111 and acts as a guide for the power take-off shaft 22. The power take-off shaft 22 is rotatably received in a bearing plate 24 and has a drive pinion 25, fixed against relative rotation, that meshes with an intermediate wheel 26 (FIGS. 1 and 8). The intermediate or idler wheel 26 is supported rotatably on a shaft 27 protruding from the bearing plate 24 and in turn meshes with a toothed quadrant 28 disposed on the outside of the cone base 152. The two cones 15, 16, the motor housing 21, the bearing plate 24, and the gear made up of the drive pinion 25, intermediate wheel 26 and toothed quadrant 28 and located between the power take-off shaft 22 and the rotatable inner cone 15 are all made of plastic. The toothed quadrant 28 and the peg 23 are injection-molded jointly onto the inner cone 15.

As can be seen from FIGS. 1 and 3, a restoring spring 29 embodied as a cylindrical helical compression spring for the inner cone 15 is received on the peg 23; one end 291 of this spring is fixed on the cone base 152, and its other end 292 is fixed on the outer cone 16. The disposition of the restoring spring 29 is made such that when the control motor 20 is not activated, it pushes the inner cone 15 back into a rotational position in which the throttle assembly closes and blocks the flow of the medium between the housing openings 12 and 13. In this process the inner cone 15 assumes a rotational position such that the flow windows 17, 18 in the cones 15, 16 do not overlap. In order to prevent even the slightest flow, in this rotational position, from the flow windows 18 in the cone 16 along the annular gap between the jacket faces 151 and 161 to the flow windows 17 in the inner cone 15, each flow window 17 is assigned an encompassing seal 30, which is secured to the outside, oriented toward the outer cone 16, of the jacket face 151 of the inner cone 15. Given a suitable choice of the sealing material, only negligible friction thus occurs between the two cones 15, 16 rotating relative to one another.

Figure 4:
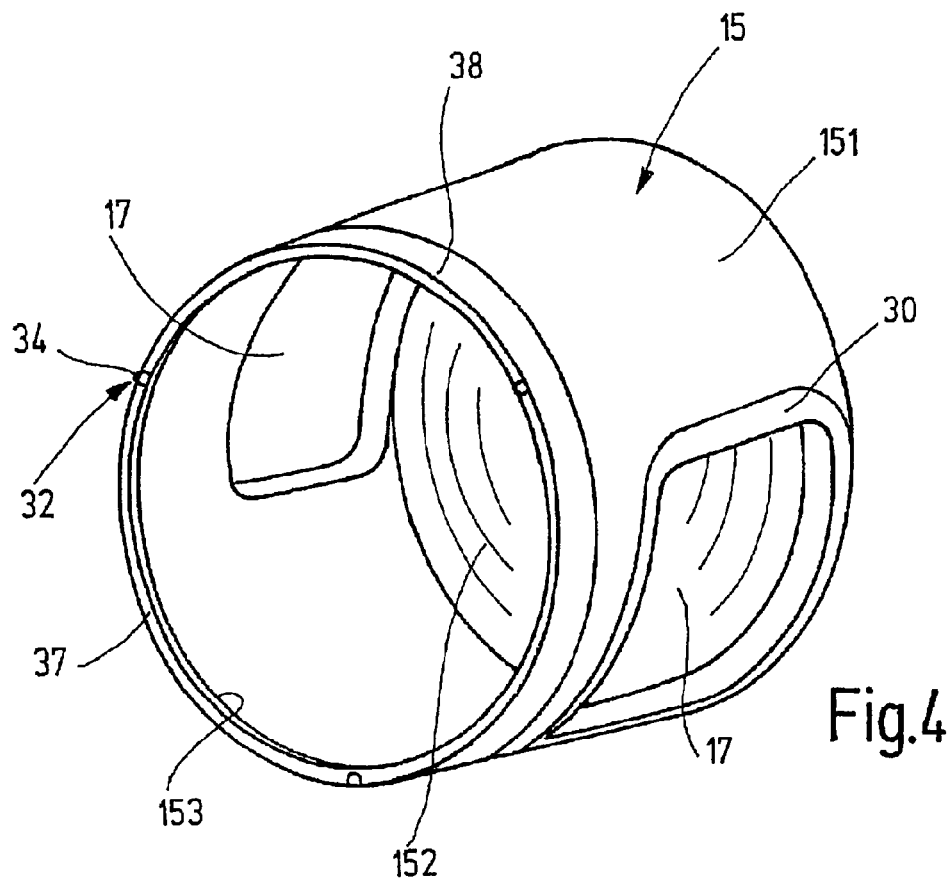
FIG. 4 is a perspective view of a throttle device of the throttle assembly in FIGS. 1–3.

As already noted at the outset, the inner cone 15, as it rotates into its rotational position that causes the complete closure of the throttle assembly, undergoes an axial displacement, in which the inner cone 15 is thrust deeper into the outer cone 16, thus overcoming the annular gap existing between the jacket faces 151, 161 of the cones 15, 16. To that end, on the one hand, on the end of the outer cone 16 oriented toward the housing opening 12, a radially inward-protruding annular rib 31 is formed (FIG. 8), which given the integral embodiment of the outer cone 16 with the housing 11 in FIGS. 1–3 is formed onto the housing part 111 and surrounds the housing opening 12, and on the other hand, the inner cone 15, with its circular-annular end face 153 remote from the cone base 152, is axially prestressed against the annular rib 31 by the restoring spring 29 acting as a spring element with an axial spring force. Between the annular rib 31 and the end face 153, at least one axially protruding plunger member 32 and at least one axially set-back receiving member 33 corresponding with it are provided, one of them being disposed on the annular rib 31 and the other on the end face 153. In the exemplary embodiment of the throttle assembly in FIGS. 1–4, the at least one plunger member 32 is formed by three pinlike cams 34, offset by 120° from one another on the circular-annular end face 153, and their free face ends are rounded in the form of a spherical cap (FIG. 4). A different number of cams with a correspondingly different offset is also possible. The at least one receiving member in the annular rib 31 is embodied by three recesses 35 in the annular rib 31, also offset from one another by 120°, one flank 351 of which is chamfered in ramplike fashion. To make the structural design of the plunger member 32 and the receiving member 33 clear, FIG. 6 shows a fragmentary section of a developed view of the annular rib 31 and the end of the inner cone 15 with the circular-annular end face 153. The inner cone 15 here has been rotated far enough that it is located just before the closing region of the throttle assembly. The cams 34 rest on the annular rib 31, because of the axial displacement force represented by arrow 36 in FIG. 6 and generated by the restoring spring 29, and thus keep the inner cone 15 in its position, counter to the axial displacement force of the restoring spring 29; in this position, an annular gap that prevents the friction between the jacket faces 151, 161 of the cones 15, 16 exists. In this position, the cone 15 can be rotated with only slight adjusting force by the electronic control motor 20, and the flow rate of the medium can thus be controlled. If the inner cone 15 is rotated farther in the direction of the closing position (upward in terms of FIG. 6), then the cams 34 slide over the flanks 351 into the recesses 35, and the inner cone 15 is axially displaced, so that the jacket faces 151, 161 come into contact with one another, and any passage of air whatever between the jacket faces 151, 161 is prevented. In addition, a sealing ring 37 is disposed on the circular-annular end face 153; this ring is recessed in the region of the cams 34, and upon displacement of the inner cone 15 it presses against the annular rib 31 (FIGS. 4 and 6).

It is understood that it is also possible to transpose the disposition of the cams 34 and recesses 35, so that the cams 34 are disposed on the annular rib 31 and the recesses 35 are disposed in the circular-annular end face 153 of the inner cone 15.

If the throttle assembly is used in the intake system of an internal combustion engine, backfiring can occur, which can trip a major pressure wave in the interior of the throttle assembly, sometimes with a blowback of heat and can cause damage to the throttle assembly. To protect against such backfiring, a ring seal 38 is provided on one end of the two cones 15, 16, between them, and seals off the annular gap between the jacket faces 151, 161 of the two cones 15, 16. In the exemplary embodiment of the throttle assembly in FIGS. 1–4, this ring seal 38 (FIG. 4) is secured to the outside of the jacket face 151 of the inner cone 15, on the end of the inner cone 15 that has the circular-annular end face 153. It is also possible for the ring seal 38 to be disposed on the other end of the inner cone 15, as shown in FIG. 5.

Figure 5:
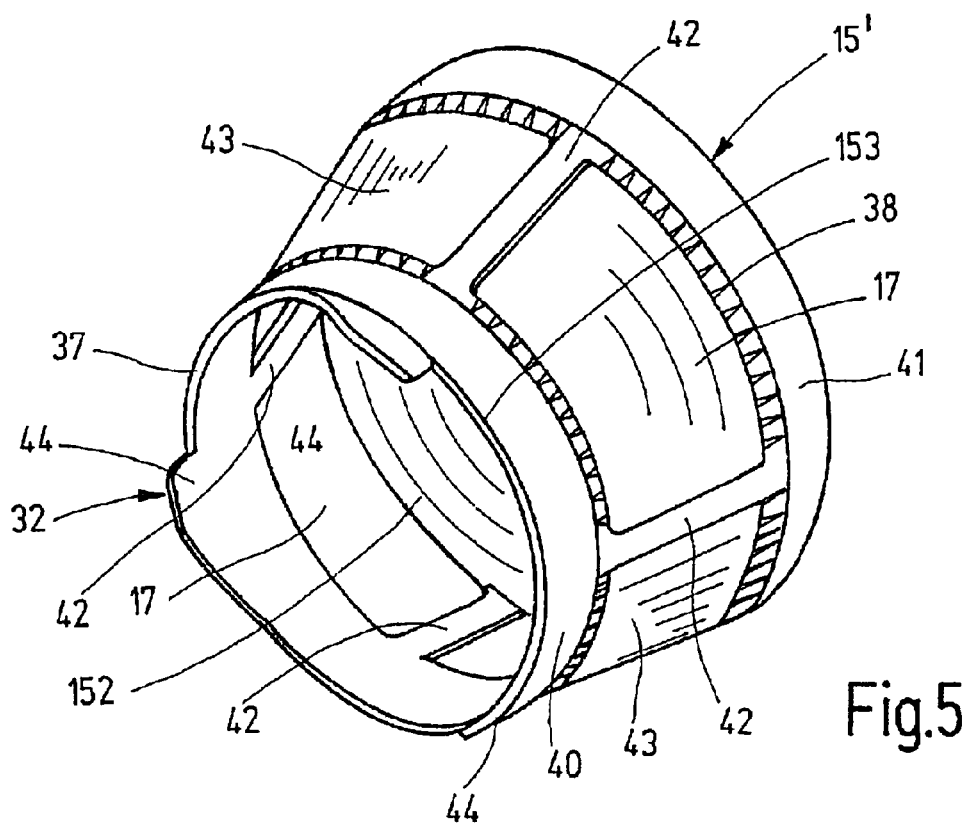
FIG. 5 is a view identical to that of FIG. 4 of a further exemplary embodiment of the throttle device.

The inner cone 15' shown in perspective in FIG. 5 can be used instead of the inner cone 15, shown in FIG. 4, in the throttle assembly of FIGS. 1–3. Unlike the cone 15 of FIG. 4, which comprises a closed cone jacket with two diametrically opposed recesses for the flow windows 17, the cone 15' comprises a lattice structure, which is put together from two spaced-apart rings 40, 41 of different diameters and ribs 42, joining the two rings 40, 41 together, that are offset from one another in a conical jacket plane by the same circumferential angle. In the exemplary embodiment of FIG. 5, there is a total of four ribs 42, which divide the conical jacket into four separate fields that are each defined in the axial direction by the rings 40, 41 and in the circumferential direction by the ribs 42. Two of these fields form the two diametrically opposed flow windows 17, and the other two fields are closed by a flexible layer 43 of a sealing material. The layer thickness selected allows the flexible layer 43 to bulge inward under the influence of a negative pressure occurring in the interior of the inner cone 15'. By this inward bulging, the flexible layer 43 is lifted away from its contact with the jacket face 161 of the outer cone 16, and the friction between the cones 15', 16 is thus reduced.

For the axial bracing of the inner cone 15' on the annular rib 31 of the outer cone 16 counter to the axial displacement force of the restoring spring 29, plunger members 32 are again disposed on the circular-annular end face 153 of the cone 15', that is, on the circular-annular free end face of the smaller-diameter ring 40; these plunger members are embodied here in the form of three axial protrusions 44, offset from one another by 120° of circumferential angle and rising in ramplike fashion. As the fragmentary sectional developed views in FIG. 7 of the ring 40 and annular rib 31 on the outer cone 16 show, the corresponding receiving members 33 in the annular rib 31 are embodied as indentations, which are capable of receiving the protrusions 44 by positive engagement, so that now in the closing position of the inner cone 15', as shown in FIG. 7, the protrusions 44 plunge into the indentations 45, and the circular-annular end face 153 rests on the annular rib 31, with the interposition of the sealing ring 30, which in turn is recessed in the region of the protrusions 44.

To remove dust, soot or dirt particles that are deposited between the jacket faces 151, 161 of the cones 15 or 15' and 16 and can cause leaks in the closing position of the throttle assembly, it is provided that in a cleaning phase of the throttle assembly, which is initiated when the engine is at a stop, the electric control motor 20 is set into vibration, in which state it brings about an oscillating pivoting motion of the inner cone 15 or 15' within a small pivoting range. To make this oscillating pivoting machine of the inner cone 15 or 15' possible, the receiving members 33 in the annular rib 31 must be capable of enabling such an oscillating motion of the plunger members 32 resting in them. As FIGS. 6 and 7 show, the recesses 35 and indentations 45 in the annular rib 31 are therefore embodied substantially wider, as viewed in the circumferential direction, than would be necessary merely to receive the cam 34 or the protrusion 44.

To avoid eddies in the flow of the medium in the housing chamber 19, it is also possible, in the process of joining the two housing parts 111, 112 to form the housing 11, to insert a slotted disk 46 into the joining plane, as can be seen in FIGS. 1 and 3. This slotted disk 46 provides for a largely laminar flow in the region of the housing part 112 that has the housing opening 13. In addition, flow guide elements 47 can also be provided, for instance in the form of fins extending axially and disposed on the motor housing 21. These fins then simultaneously serve to dissipate heat losses occurring in the control motor 20.

The throttle assembly shown in fragmentary perspective in FIG. 8 agrees extensively with the throttle assembly described above, and identical components are therefore identified by the same reference numerals. It is modified only to the extent that the outer cone 16 is not an integral part of the housing 11 but instead is a separate part, which is secured in the housing part 111 in a suitable way. The annular rib 31 for axially contacting the circular-annular end face 153 of the inner cone 15 is embodied—as can be seen from FIG. 8—on the face end of the outer cone 16 oriented toward the housing opening 12 in the housing part 111. No attempt has been made to show the receiving members 33, machined in the annular rib 31, for the plunger members 32 on the end face 153 of the inner cone 15.

Given a suitable design of the incoming- and outgoing-air geometry of the throttle assembly, for instance as an integral component of the air intake stub or of the bypass line, it is possible to dispense with the housing 11, in which case the housingless throttle assembly is sold as a "stand-alone" component intended for integration at the installation site.

The foregoing relates to preferred exemplary embodiments of the invention, it being understood that other variants and embodiments thereof are possible within the spirit and scope of the invention, the latter being defined by the appended claims.

I claim:

1. In a throttle assembly for a flowing medium, having an inlet and outlet and two throttle devices disposed between them coaxially to one another, which have at least one flow window (17, 18) for the passage through it of a flow of the medium flowing from the inlet to the outlet and are rotatable relative to one another for controlling the flow of the medium, the improvement wherein each throttle device is embodied as a hollow cone (15, 16), with a cone jacket (151, 161) that contains the at least one flow window (17, 18); wherein the cones (15, 16) are disposed concentrically to one another with a gap spacing between their cone jackets (151, 161) and are displaceable axially relative to one another; and wherein displacement means engaging at least one cone (15) are provided, which are operative in a closing region, defined by the flow windows (17, 18) that do not overlap, of the throttle assembly and bring about an axial relative displacement of the cones (15) in a direction that reduces the gap spacing between the cone jackets (151, 161).

2. The throttle assembly according to claim 1, wherein the displacement means are embodied such that the axial relative displacement is compelled as a result of the rotation of at least one cone (15).

3. The throttle assembly according to claim 2, wherein the displacement means have a stop and a counterpart stop cooperating with it, each of which is disposed on one of the cones (15, 16), and a spring element that presses the stop and counterpart stop against one another in the axial direction of the cones (15, 16); and that between the stop and the counterpart stop, at least one axially protruding plunger member (32) and at least one axially set-back receiving member (33) corresponding with it are provided, of which one is disposed on the stop and one on the counterpart stop in such a way that in the closing region of the throttle assembly, the plunger member (32) plunges into the receiving member (33).

4. The throttle assembly according to claim 3, wherein at least one of the two members (32, 33) is provided with a run-up chamfer, extending in the circumferential direction of the cones (15, 16), which is disposed such that upon leaving the closing region of the throttle assembly, the other member (32, 33) runs up against the run-up chamfer.

5. The throttle assembly according to claim 3, wherein that one stop is formed by a circular-annular end face (153) of the inner cone (15), and the counterpart stop is formed by a radially inward-protruding annular rib (31) disposed on the outer cone (16).

6. The throttle assembly according to claim 5, wherein the plunger member (32) is embodied as a can (34) protruding from the end face (153), and the receiving member (33) is embodied as a recess (35), machined into the annular rib (31) and having a chamfered flanked (351).

7. The throttle assembly according to claim 5, wherein the plunger member (32) is embodied as a protrusion (44), rising in ramplike fashion, on the end face (153), and the receiving member (33) is embodied as an indentation 45, machined into the annular rib (31) and receiving the protrusion (44).

8. The throttle assembly according to claim 5, wherein disposed between the annular rib (31) and the end face (153) is a sealing ring (37), which is secured to one of the cones (15) and is recessed in the region of the member (32) that is carried by the cone (15).

9. The throttle assembly according to claim 1, wherein at least one cone (15), on its jacket face (151) oriented toward the other cone (16), carries a sealing ring (30) that surrounds the at least one flow window (17).

10. The throttle assembly according to claim 1, wherein disposed on one end of the two cones (15, 16), between the faces oriented toward one another of the cone jackets (151, 161), is a ring seal (38), which is secured to one of the faces oriented toward one another of the cone jackets (151).

11. The throttle assembly according to claim 1, wherein one cone (16) is embodied as fixed, and the other cone (15)

is embodied as rotatable about a common cone axis and displaceable along the cone axis.

12. The throttle assembly according to claim 11, wherein the fixed cone (16) is the outer one of the two cones (15, 16) and is integrated into a housing (11), which has two housing openings (12, 13) forming the inlet and outlet, in such a way that one housing opening (13) communicates with a housing chamber (19) surrounding the outer cone (16), and one housing opening (12) communicates with the interior of the inner cone (15), and that the inner cone (15) is closed, on its end remote from the housing opening (12), by a cone base (152).

13. The throttle assembly according to claim 12, wherein the outer cone (16) is embodied integrally with the housing (11).

14. The throttle assembly according to claim 12, wherein an electric control motor (20) with a power take-off shaft (22) is disposed in the housing (11), and that the power take-off shaft (22) is coupled with the inner cone (15) via an intermediate gear (25–28).

15. The throttle assembly according to claim 14, wherein the electric motor (20) is received in a motor housing (21), which is secured in the housing (11) with a housing axis that is aligned with the common axis of the cones (15, 16).

16. The throttle assembly according to claim 15, characterized in that the housing (11) has two housing parts (111, 112); that one housing part (112) contains one housing opening (13) and the motor housing (21); and the other housing part (111) has the outer housing opening (12) and the outer cone (16); and that the two housing parts (111, 112) are placed against one another in a plane extending transversely to the common axis of the cones (15, 16).

17. The throttle assembly according to claim 12, wherein the inner cone (15) is engaged by a restoring spring (29), which subjects the inner cone (15) to a spring force that causes a rotation of the inner cone (15) to a spring force that causes a rotation of the inner cone (15) in the direction of the closing position of the throttle assembly.

18. The throttle assembly according to claim 17, wherein the spring element that displaces the cones (15, 16) engages the inner cone (15) and is formed by the restoring spring (29).

19. The throttle assembly according to claim 17, wherein the restoring spring (29) is embodied as a cylindrical helical compression spring.

20. The throttle assembly according to claim 17, wherein the restoring spring (29) and a toothed quadrant (28) of an intermediate gear (25–28) are disposed on the outside of the cone base (152) of the inner cone (15).

21. The throttle assembly according to claim 12, wherein the cone (15') communicating with the housing opening (12) forming the inlet is embodied as a lattice structure comprising two axially spaced-apart rings (40, 41) and ribs (42) joining the rings (40, 41) together; and that the fields in the cone jacket (151) that are enclosed by the rings (40, 41) and ribs (42), with the exception of at least one field forming the flow window (17), are closed by a flexible layer (43) of a sealing material.

* * * * *